United States Patent Office 3,137,629
Patented June 16, 1964

3,137,629
PLAGUE VACCINES

Edward Charles Daniel Cocking, Woodthorpe, Nottingham, James Keppie, Alderbury, near Salisbury, and Leslie Philip Packman and Harry Smith, Salisbury, England, assignors to National Research Development Corporation, London, England No Drawing. Filed Dec. 1, 1961, Ser. No. 156,514
Claims priority, application Great Britain Dec. 5, 1960
4 Claims. (Cl. 167—78)

The present invention relates to the production of vaccines for immunization against plague.

The invention is concerned with the production of an improved dead vaccine which is water soluble without significant loss of immunizing activity.

The production of a non-toxic complex of *Pasteurella pestis* having immunizing properties by ultrasonic treatment has been described by J. Keppie, E. C. Cocking and H. Smith in The Lancet, February 1, 1958, at pp. 246–247. This complex however is an insoluble cell wall preparation which is separated from a toxic supernatant and can be used as a vaccine only as a suspension in saline.

We have now discovered that a water soluble plague vaccine, which can be readily sterilized by filtration and tends to produce less reaction on injection, can be prepared without loss or serious loss of immunizing activity by dissolving or at least largely dissolving *Pasteurella pestis*, preferably disrupted by mechanical treatment, in a solution of an alkali such as sodium or potassium hydroxide. Furthermore this treatment with an alkali greatly reduces the toxicity of *Pasteurella pestis* and it is therefore not necessary, when mechanical treatment, for example, ultrasonic treatment, is given, to separate the insoluble residue obtained by the ultrasonic treatment from the toxic supernatant as described in the Lancet paper referred to above. Disruption of the *Pasteurella pestis* prior to the alkali treatment enables a large proportion of it to be dissolved and a larger portion of antigenic material to be released.

The plague vaccine may be produced by subjecting *Pasteurella pestis* (for example, the EV76, the L37 or the Tjiwidej Strain) grown at about 37° C., to mechanical treatment such as ultrasonic or other mild treatment (for example, using a Hughes press or a Mickle or Sonomec disintegrator) and treating the material with alkali to dissolve a large proportion (at least 90%) of it. The resulting solution is filtered sterile preferably after reducing the pH value.

The selected strain of *Pasteurella pestis* is grown at 37° C. in a conventional nutrient medium for about one day. The organisms are concentrated into a sludge, disrupted by ultrasonic or like treatment and then almost completely dissolved in a strongly alkaline solution (having a pH value of 12 or more) for a period which should be at least five minutes but should not be unnecessarily prolonged in order to avoid degeneration of some of the antigenic material. The solution is then clarified and filtered sterile, preferably after reducing the pH value, for example, to about 9.2 by addition of a glycine buffer solution. The soluble plague vaccine is then obtained by reducing the pH of the solution to a neutral value around that of blood by addition of acid.

The production of a plague vaccine will now be described in detail by way of example.

An inoculum of $1\times10^8$ organisms per ml. of the EV76 strain of *Pasteurella petis* is grown at 37° C. in shake culture in a medium consisting of a tryptic meat broth containing 1% (w./v.) galactose. After 22 hours' growth the organisms are collected by centrifugation and washed once with sale. The organisms from 1 litre of a suspension of $1\times10^{10}$ organisms per ml. are collected into a sludge of 50 ml. volume. This sludge is treated for one hour (at 0° to 4° C.) with an M.S.E. ultrasonic drill operating at a frequency at 20 kc./s. The organisms are largely disintegrated by this ultrasonic treatment.

The sludge is diluted to 900 ml. and 100 ml. of N sodium hydroxide is added and the mixture left for about ten minutes at room temperaure. 45 g. of solid glycine are then added until the pH value is 9.2. The slightly turbid solution is clarified by centrifugation and filtered sterile. After filtration, the pH value is adjusted to 7.6 by the addition of hydrochloric acid.

The following table shows the results of immunity tests in guinea pigs and mice on a soluble plague vaccine produced by the EV76 strain of *Pasteurella pestis* as described above. The tests consisted of two subcutaneous immunizing injections, two weeks apart, of the vaccine in various strengths, the injection strengths being given as the amount of vaccine (equivalent to number of organisms$\times10^{10}$) given in each dose. The animals were challenged subcutaneously and by the respiratory route. The results are given as a fraction—number of survivors—number in test—and as percentage of survivors for animals protected by injections of a standard live vaccine of the EV76 strain, for animals treated with the soluble vaccine in the three stated dose strengths, and for untreated control animals.

*Guinea Pigs*

| Dose | Sub-cutaneous Challenge | Percent | Respiratory Challenge | Percent |
|---|---|---|---|---|
| Live | 59/59 | 100 | 59/60 | 98 |
| 5.0 | 115/119 | 97 | 79/106 | 75 |
| 1.0 | 109/120 | 91 | 49/102 | 48 |
| 0.2 | 29/40 | 73 | 10/40 | 25 |
| None | 3/100 | 3 | 3/80 | 4 |

*Mice*

| Dose | Sub-cutaneous Challenge | Percent | Respiratory Challenge | Percent |
|---|---|---|---|---|
| Live | 69/78 | 89 | 138/186 | 74 |
| 0.1 | 102/135 | 76 | 247/336 | 73 |
| 0.03 | 79/137 | 58 | 30/40 | 75 |
| 0.01 | 55/135 | 41 | 23/40 | 58 |
| None | 5/99 | 5 | 51/139 | 37 |

The results given in the table show that the safe and soluble dead vaccine confers the same order of immunity as the potentially unsafe live vaccine.

It will be understood that ultrasonic treatment is used in the specification to describe treatment which sets up sonic vibrations, generally but not necessarily, at a frequency beyond the audio range.

We claim:

1. A process for producing a killed plague vaccine which immunizes mice and guinea pigs comprising growing *P. pestis* at about 37° C. in a nutrient medium, mechanically disrupting this *P. pestis* to obtain a cell wall preparation and a soluble extract, treating the disrupted *P. pestis* with a strongly alkaline solution having a pH of at least 12 to dissolve at least a substantial proportion of *P. pestis* and preparing the parentially acceptable vaccine by reducing the pH value of the soluble *P. pestis* antigenic solution to about the pH value of blood.

2. A process according to claim 1 in which the *P. pestis* solution is filtered after treatment with the alkaline solution.

3. A process according to claim 1 in which the disrupted *P. pestis* is held substantially all dissolved in a strongly alkaline solution of an alkali metal hydroxide for at least 5 minutes.

4. A killed plague vaccine which immunizes mice and guinea pigs prepared by the proces of claim 1.

References Cited in the file of this patent

Keppie et al.: "A Non-Toxic Complex From *Pasteurella pestis* Which Immunizes Both Guinea Pigs and Mice," The Lancet, pp. 246–247, February 1, 1958.

Aronson et al.: "Temperature and pH Dependent Changes of Electrophoretic Mobility of *Pasteurella pestis*," J. Bact., vol. 79; pp. 734–740, May 1960.

Smith et al.: "The Chemical Basis of the Virulence of *Pasteurella pestis*. I. The Isolation and the Aggressive Properties of *Past. pestis* and its Products from Infected Guinea Pigs," Brit. J. Exp. Path., vol. 41, pp. 452–459, October 1960.

Cocking et al.: "The Chemical Basis of the Virulence of *Pasteurella pestis*. II. The Toxicity for Guinea-Pigs and Mice of Products of *Past. pestis*," Brit. J. Exp. Path., vol. 41, pp. 460–471, October 1960.

Keppie et al.: "The Chemical Basis of the Virulence of *Pasteurella pestis*. III. An Immunogenic Product Obtained from *Past. pestis* Which Protects Both Guinea Pigs and Mice," Brit. J. Exp. Path., vol. 41, pp. 577–585, December 1960.

Buckland et al.: "A Comparison of Plague Vaccines by the Mouse Protection Test," J. Hyg. (Lond.), vol. 59, pp. 49–56, March 1961.

Bene-Efraim et al.: "New Antigenic Component of *Pasteurella pestis* Formed Under Specified Conditions of pH and Temperature," J. Bact., vol. 81, No. 5, pp. 704–714, May 1961.

Chen et al.: "Experimental Comparison of the Immunogenicity of Antigens in the Residue of Ultrasonated Avirulent *Pasteurella pestis* With a Vaccine Prepared With Killed Virulent Whole Organisms," J. Immun., vol. 87, pp. 64–71, July 1961.